Figure 1:
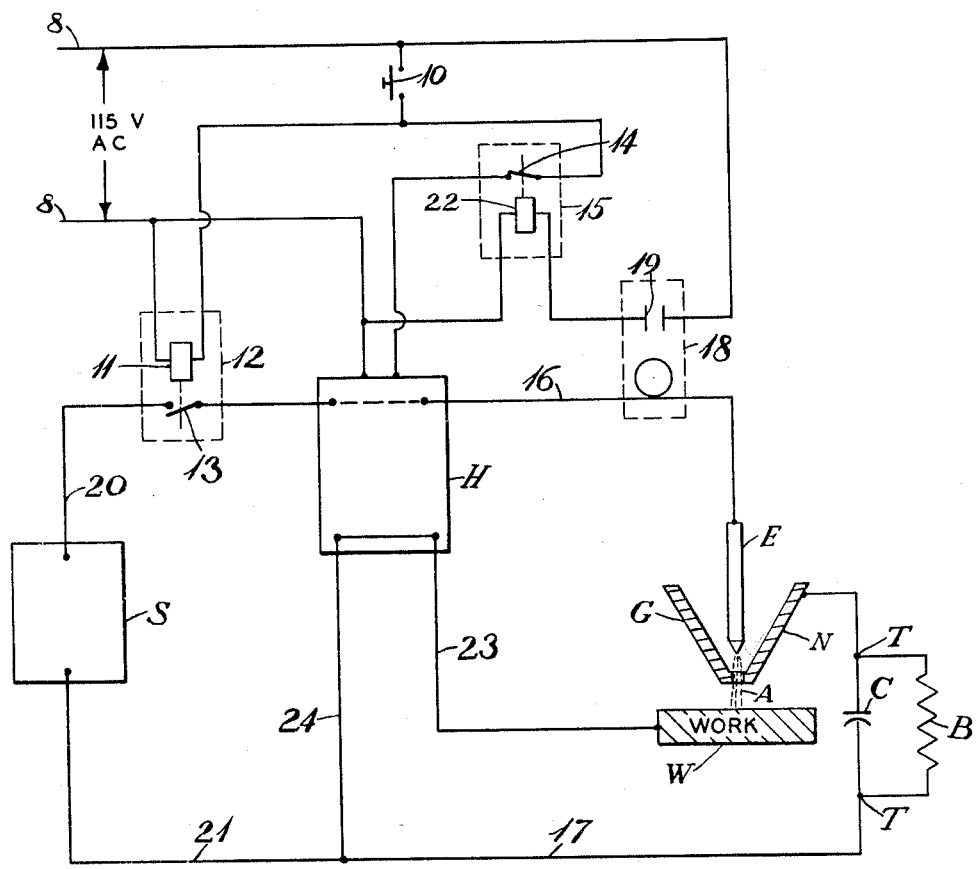

United States Patent Office 3,174,027
Patented Mar. 16, 1965

3,174,027
PILOT ARC STARTING-ARC WORKING
SYSTEMS
August F. Manz, Newark, N.J., assignor to Union Carbide
Corporation, a corporation of New York
Filed Sept. 25, 1962, Ser. No. 226,186
3 Claims. (Cl. 219—131)

This invention relates to electric arc working, and more particularly to pilot arc starting-arc working systems.

The invention provides an arc working system comprising means for ionizing gas between electrodes one of which is the main electrode of an arc torch, means acting in response to such ionization for energizing a pilot arc between such electrodes to ionize a stream of gas discharged from such torch, comprising means for automatically limiting the duration of such pilot arc, and means acting in response to the application of such ionized gas stream to work in circuit with said electrode for energizing a working arc between the end of said main electrode and the work.

According to the invention there is also provided in an arc working system, an arc torch comprising a main electrode and a gas nozzle insulated from said electrode, and means for initiating a working arc between said electrode and work in circuit therewith, comprising means to ionize gas in such torch between said nozzle and said electrode, means for supplying pulses of current at preselected intervals to energize a pilot arc across the so-ionized gas path between said electrode and nozzle to further ionize gas flowing out of said nozzle as long as the arc torch is spaced a predetermined distance from such work, and means acting automatically to discontinue such pilot arc pulses when the arc torch is located close enough to such work to cause such working arc to be established by the so-ionized gas flowing out of the nozzle.

In the preferred embodiment of the invention, a capacitor is associated with said current pulse supply means, which acts as a conductor during the charging period until the capacitor is fully charged, whereupon the pilot arc current ceases. A bleeder resistor is connected across said capacitor to discharge the latter. It should be noted here that the present use of the condenser is *not* that involved in *discharging* a condenser to produce a current pulse, but use is made of the capacitor *charging* current to energize the pilot arc.

In a modification of the invention, relays are associated with high-frequency voltage, and current pulse supply means for operating the latter to open the circuit of said pilot pulse supply means to de-energize such pilot arc during such intervals.

In arc working operations using a work-in-circuit constricted arc process of the type described in Patent No. 2,806,124, of Robert M. Gage, main arc initiation is sometimes erratic and inconsistent. This is largely due to the fact that the arc must bridge a considerable gap between the electrode and the workpiece. Consistent starting can be achieved by using shorter torch-to-work distances, but this in many cases, results in excessive wear on the orifice and shorter nozzle life because of spatter accumulations on the nozzle.

In starting constricted direct current arcs of the transferred type one of the prior commercial practices dictated the use of an alternating high-frequency current to bridge the gap between the electrode and the nozzle, which gap is relatively small in comparison to the electrode-to-work distance. The high-frequency arc is used to ionize the gas between the electrode and the nozzle in order to start a pilot arc between the electrode and the nozzle. The pilot arc, in turn, ionizes the gas flowing to the workpiece and initiates the main arc between the electrode and the workpiece.

In addition to the limited torch-to-work distance which may be used, other disadvantages accrue from the use of such starting means. The pilot arc is generally provided from the main power supply by means of a current limiting resistor connected in series circuit relationship between the torch nozzle and the power supply. When the main arc is energized, the pilot arc is not extinguished, and a portion of the power supply current continues to flow through the pilot arc circuit. This amount of current is not usable in the arc working operation, thus the current available for the main arc is reduced by the amount consumed in the pilot arc circuit. Another disadvantage of such system is that the current limiting resistor must be large, and thus, expensive in order to dissipate the power it consumes. In addition, it must be mounted in a suitable enclosure so that the heat dissipated does not damage other elements of the control.

The primary object of this invention is to provide an improved arc initiation means for direct current transferred constricted arc working. More particularly, the main object of the invention is to provide more consistent arc initiation at longer torch-to-work distances than is possible with prior art arc starting means. Another object is to eliminate the relatively expensive current limiting pilot arc resistor and the enclosure therefor. Still another object is to provide means which operates automatically to terminate the flow of pilot arc current once the main arc is established. Other objects will appear from the following disclosure.

The objects of the present invention are achieved by providing a condenser and a bleeder resistor in parallel circuit relationship with each other, in series circuit relationship between the power supply and the torch nozzle. In essence, the parallel R-C network replaces the current limiting pilot arc resistor of prior art arc initiation means. In the present invention, as in one of the prior art means, a high-frequency alternating current can be used to initiate the arc starting means. How the R-C network and high-frequency alternating current act to initiate a transferred constricted arc will be more apparent from a study of the drawings.

Figure 2:
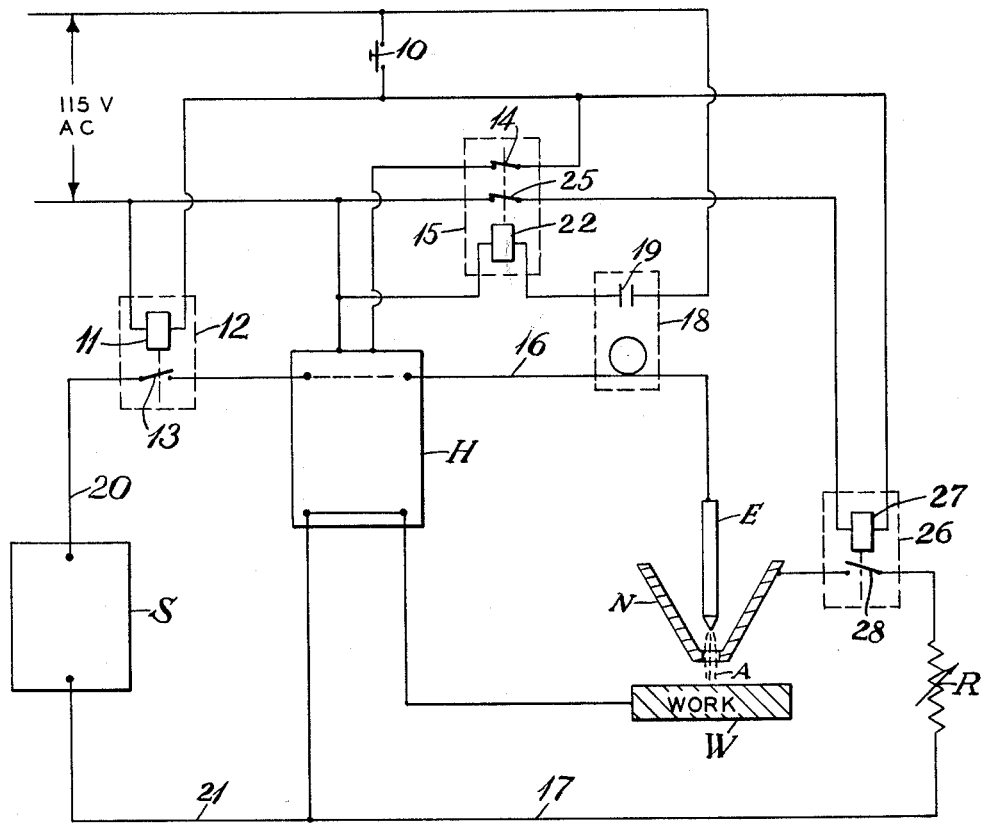

In the drawings:

FIG. 1 is a circuit diagram of transferred constricted arc working apparatus illustrating the present invention for arc initiation; and FIG. 2 is a circuit diagram of an alternative embodiment of the present invention utilizing relay means to provide the momentary high current pilot arc.

FIG. 1 which represents circuitry for starting transferred constricted arcs, comprises two circuits. First, there is an arc power and pilot arc circuit which includes a direct current power supply S, high-frequency generator H, torch G having a main electrode E and gas nozzle N, workpiece W and a direct current pilot arc current circuit having terminals T, T, and associated power cables. Secondly, there is provided a control circuit which includes a 115 volt A.C. supply 8, 8, starting switch 10, secondary contactor 12, pilot arc relay 15, current relay 18, and associated electrical conductors. In the past an adjustable current limiting resistor only was connected across terminals T, T.

Arc initiation with such adjustable resistor (not shown) was accomplished in the following manner. The operator closed start switch 10. This in turn supplied 115 volts A.C. to the coil 11 of secondary contactor 12, closing contacts 13. At the same time high-frequency generator H was energized through normally closed contacts 14 of pilot arc relay 15.

High-frequency generator H provided an alternating high-frequency current which flows through the circuit comprising power cable 16, electrode E, torch nozzle N, pilot arc current limiting resistor (not shown), and power cables 17 and 24. The high-frequency current jumps the gap between the electrode E and nozzle N, establishing a high-frequency alternating current arc across this gap. The high-frequency arc does not jump from the electrode to the workpiece W, since this gap is considerably greater than the gap between the electrode E and nozzle N. The high-frequency arc within the torch nozzle ionized the gas being discharged from the nozzle and allows the power supply to establish a pilot arc between electrode E and nozzle N. Welding power flows from the power supply S through power cable 20, the now closed contacts 13 of secondary contactor 12, high-frequency generator H, power cable 16, electrode E, torch nozzle N, the pilot arc resistor (not shown, between terminal T, T) and back to power supply S through power cables 17 and 21.

The current flowing through the pilot arc circuit thus, was limited to a value of the order of magnitude of about 15 amperes, depending on the setting of such adjustable resistor (not shown). The flow of pilot arc current through power cable 16 was sufficient to energize current relay 18, closing its contacts 19. When contacts 19 close, coil 22 of pilot arc relay 15 is energized from the 115 volt A.C. source. Contacts 14 of pilot arc 15 relay open, thus deenergizing the high-frequency generator H. The flow of high-frequency alternating current through the pilot arc circuit ceases.

When the torch was positioned over the workpiece sufficiently close, that the ionized pilot arc effluent reached to the workpiece, the arc automatically transferred to the workpiece W, establishing main arc A at the current setting of the power supply S. The arc power then flowed from power supply S through power cable 20, closed contacts 13 of secondary contactor 12, high-frequency generator H, conductor 16, electrode E, arc A, workpiece W, power cable 23, high-frequency generator H, and power cable 24. At the same time, however, a parallel arc circuit was maintained through the pilot arc current limiting resistor (not shown) to the ground side of power supply S. A portion of the power supply output continued to flow through this parallel circuit, thus proportionately reducing the power available to the main arc A.

Another disadvantage of the prior system lies in the fact that the main arc could be established only at nozzle-to-work distances up to about 3/8 in. In order to increase the torch-to-work distance for starting, it would be necessary to increase the current in the pilot arc circuit by reducing the value of the adjustable resistor. In practice this cannot be done, since higher pilot arc current would result in damage to the torch nozzle N. Nozzle N acts as either the anode or the cathode of the pilot arc, depending on the polarity of power supply S. Higher pilot arc currents would cause erosion of the nozzle at the point from which the arc is emitted.

According to the present invention, however, a main arc can be started consistently at nozzle-to-work distances up to 1½ ins. with the RC system of the invention as shown in FIG. 1. The circuit practically is identical to that of the prior art, except that the pilot arc current limiting resistor is replaced with a condenser-resistor network between terminals T, T, comprising a condenser C and a resistor B. The control circuit functions in the same manner as described above.

When start switch 10 is closed, secondary contactor 12 and high-frequency generator H are energized. Contacts 13 of secondary contactor 13 close, and a high-frequency alternating current arc is established across the gap between electrode E and nozzle N, through the circuit comprising high-frequency generator H, power cable 16, electrode E, nozzle N, capacitor C and power cables 17 and 24. The high-frequency arc creates an ionized path between electrode E and nozzle N. If condenser or capacitor C is in a discharged state, it appears as a short circuit (low impedance). Instantaneously, direct current power supply S establishes a pilot arc at full circuit current across the ionized path between electrode E and nozzle N. As pilot arc current continues to flow, the capacitor becomes charged, placing increasing impedance in the pilot arc circuit.

Eventually the capacitor C becomes charged to the extent that pilot arc current falls to zero. During the capacitor charging period, a pilot arc is maintained between electrode E and nozzle N. Initially the pilot arc current has a value approximately equal to that at which the power supply is adjusted for the arc working operation. It then drops to zero due to the accumulating charge on the capacitor C. The high current momentary pilot arc thus created produces a pulse of ionized gas which is ejected from the nozzle N. When the nozzle is positioned relative to the workpiece so that an ionized path is established between electrode E and workpiece W, the main arc A will transfer to the workpiece if the potential between electrode E and workpiece W is sufficient to maintain the arc.

At the time the pilot arc is established, current relay 18 is energized by the flow of current through power cable 16. Current relay contacts 19 close, providing 115 volts A.C. to coil 22 of pilot arc relay 15. Pilot arc relay contacts 14 thus open, de-energizing high-frequency generator H.

The resistor B is included in parallel circuit relation with capacitor C and has a resistance value sufficient to act primarily as a bleeder. Bleeder resistor B is used to drain the charge from the capacitor to prepare it for subsequent starts.

If for some reason the main arc does not transfer when the momentary pilot arc is established, the pilot arc will be extinguished as the charge on capacitor C builds up. However, the cycle will automatically be self-repeating until main arc A is established, provided start switch 10 remains closed. When pilot arc current ceases to flow, current relay 18 is de-energized and its contacts 19 open. This breaks the flow of 115 volt A.C. through coil 22 of pilot arc relay 15 and contacts 14 close, energizing high-frequency unit H. A high-frequency alternating current arc is again established between electrode E and nozzle N. As soon as bleeder resistor B sufficiently drains the charge from capacitor C, the power supply S automatically re-establishes the momentary pilot arc between electrode E and nozzle N. The relationship of capacitance and resistance of capacitor C and resistor B, respectively, determined the discharge rate of the capacitor, and hence, the repetition rate of the capacitor-charge pilot arc.

The values of capacitance and resistance in the capacitor-charge pilot arc circuit required to effect arc starting depend, in part, on the open circuit voltage of the power supply and the nozzle-to-work distance used. For the majority of applications using direct current power supplies with an open circuit voltage of the order of magnitude of 120 volts, a capacitance ranging from 1000 to 6000 microfarad has been satisfactory. When considerably higher open circuit voltages are used, somewhat lower values of capacitance may be required. If too low a capacitance is used, the pilot arc will have insufficient power to establish the main arc. If the capacitance is too high, damage to the torch nozzle may occur due to excessive duration of the pilot arc. The bleeder resistor B must have a value at least high enough so that a continuous pilot arc can not be maintained. From a practical consideration, it is impossible to maintain a pilot arc of less than 2 amperes since the gas flow through the nozzle would extinguish such arc. Therefore, in constricted arc working, the minimum resistance of bleeder resistor B may be expressed as:

$$Rb \text{ (ohms)} = \frac{\text{power supply open circuit voltage}}{2 \text{ (amperes)}}$$

For example, if the power supply has an open circuit voltage of 110 volts, a bleeder resistor B of 55 ohms or greater is sufficient to prevent maintaining the pilot arc while the main arc is in operation. The bleeder resistor B carries no appreciable current at any time during the starting or operating cycle.

In the development of the capacitor charge means for initiating a transferred direct current constricted arc, an alternative embodiment of the circuit of the present invention was first employed which used relay means to provide the momentary high current pilot arc. The circuit for such embodiment of the invention is shown in FIG. 2. In this alternative circuit, pilot arc current path is provided between the electrode, the torch nozzle and the power supply, and the pilot arc current is interrupted by relay contacts as soon as the pilot arc is established. The circuit operates in the following manner:

When start switch 10 is closed, 115 volts A.C. is applied to coil 11 of secondary cointactor 12, high-frequency generator H, and coil 27 of auxiliary pilot arc relay 26. Secondary contactor contacts 13 close and contacts 28 of auxiliary pilot arc relay 26 also close. This completes the pilot arc circuit from power supply S through cable 20, contacts 13, high-frequency generator H, cable 16, electrode E, nozzle N, contacts 28, and cables 17 and 21. The high-frequency generator H is energized and establishes a high-frequency alternating current arc between electrode E and nozzle N. The high-frequency arc ionizes gas flowing through nozzle N and causes the main power supply S to establish a pilot arc at the full current setting of the power supply across the ionized path.

With the flow of current through cable 16 of the pilot arc circuit, current relay 18 is energized and its contacts 19 close. This applies 115 volts A.C. to coil 22 of pilot arc relay 15, opening both sets of normally closed contacts 14 and 25. Opening contacts 14 interrupt the flow of 115 volts A.C. to the high-frequency generator H, de-energizing this unit and extinguishing the high-frequency alternating current arc. Opening contacts 25 interrupt 115 volts A.C. to the coil 27 of auxiliary pilot arc relay 26, de-energizing this relay and opening contacts 28. When contacts 28 open, the pilot arc circuit is broken and the pilot arc is extinguished. However, during the short period when the pilot arc is on, a pulse of ionized gas is discharged from nozzle N and, if the touch is properly positioned over the workpiece W, the main arc A will transfer from electrode E to workpiece W, establishing arc A.

With this system, main arc initiation is as reliable as with the preferred capacitor charge embodiment of the present invention. A disadvantage of this system, however, in comparison with the capacitor charge system, is that an adequately rated auxiliary pilot arc relay is relatively large and exepnsive. It must be large in order to handle the relatively high currents and voltages of the pilot arc in order to eliminate damage to the contacts due to arcing when contacts 28 open. In addition, the capacitor charge pilot arc system has no moving parts which can eventually wear.

In utilizing the alternative system for producing a momentary pilot arc it was determined that full power supply current might be destructive to the orifice even though the pilot arc is only momentary. Therefore, as a safety feature, the circuit of FIG. 2 includes a current limiting adjustable resistor R in the pilot arc circuit.

However, the pilot arc is only momentary and current limiting resistor R need not have as great a resistance as in the prior art circuit in order to protect the nozzle. The lower resistance thus permits higher pilot arc currents and improved main arc starting. A current limiting resistor R having a range of not more than 0 to 5 ohms is satisfactory for virtually all applications. The resistor may be set to provide the maximum pilot arc current that can be safely handled without damage to the orifice during the short period the pilot arc is energized.

The maximum pilot arc current which can safely be used will depend upon the torch design, the open circuit voltage of the power supply, the current setting on the power supply, and on the static characteristic of the power supply. In some cases up to several hundred amperes of pilot arc current may be acceptable. In other cases pilot arc currents may have to be limited to as low as 20 amperes in order to prevent damage to the nozzle. This differs from the prior art system where the pilot arc current was continuous and had to be limited to from approximately 5 to 15 amperes.

The capacitor charge system, FIG. 1, has been tested in an installation for transferred constricted arc welding. The power supply was a commerically available conventional rectifier type direct current machine, having an open circuit voltage of 78 volts. Bead-on-plate welds were made on 3/16 in. thick type 304 stainless steel, using straight polarity (electrode negative, work positive). The pilot arc circuit included a 6000 microfarad capacitor in parallel circuit relation with a 50 ohm bleeder resistor. The welding torch had a 1/8 in. diameter tungsten electrode containing 2 percent thoria and a water-cooled copper nozzle having a 1/8 in. diameter orifice with a 3/32 in. throat length. The end of the electrode was set back from the face of the nozzle 5/32 in. Argon flows of 5½ c.f.h. were passed through the torch nozzle and, in addition, an auxiliary flow of 40 c.f.h. was discharged surrounding the arc zone to shield the workpiece. Welding conditions for this application were as follows:

Arc voltage _____ volts__ 33
Arc current _____ amperes__ 170
Travel speed _____ i.p.m__ 8
Nozzle-to-work distance _____ ins__ 5/16

While the nozzle-to-work distance was maintained at 5/16 in. in order to produce optimum weld quality, tests were conducted at such conditions to determine the maximum range at which consistent starting could be obtained. It was found that complete reliability of main arc starting could be obtained at nozzle-to-work distances up to at least 1¼ in. However, up to 3–4 inches in such distances were obtained in other tests.

Other tests have also been performed with the system of the present invention to demonstrate its versatility for constricted arc starting. For example, in a metal cutting application the system was used to start a transferred constricted arc using power supplies having an open circuit voltage of about 440 volts and with gas flows up to 200 c.f.h. through the torch nozzle. In such case, a 2000 microfarad capacitor was used. Consistent starting was achieved in every case.

The preferred system of the present invention has been found to offer significant new and unexpected advantages over the prior art starting means for transferred, direct current constricted arcs. These include:

(1) Greatly increased pilot arc intensity due to the initial low impedance of the capacitor circuit. This produces consistent starting at nozzle-to-work distances up to four times greater than with the prior art system.

(2) Utilization of the full power supply output for the main arc due to the self-extinguishing characteristic of the capacitor charge pilot arc.

(3) Elimination of heat losses which were present when a current limiting pilot arc resistor was used.

(4) Decrease in size, weight, and cost of pilot arc components.

(5) Improved reliability of main arc starting.

(6) In addition to the above advantages over conventional starting means, the present invention has proved especially beneficial for starting high gas flows, as for example, in constricted arc metal cutting and for constricted arc working with direct current reverse polarity (work cathode and electrode anode). To start a direct current arc, the pilot arc must, of necessity, always be of the same polarity as the main arc. As is well known in the art, reverse polarity arcs are extremely unstable.

This is equally true of a reverse polarity pilot arc, and such pilot arc is difficult to maintain, and starting is very inconsistent. With the inventive system, starting a reverse polarity main arc also requires a reverse polarity pilot arc. However, the pilot arc is momentary and is very stable due to its initial high current. Thus, capacitor charge starting has proved a reliable means for starting a reverse polarity transferred constricted arc.

In this invention novel means are provided to create a momentary, high current pilot arc pulse to effect starting of a transferred direct current constricted arc. The means may also be adapted to start non-constricted arcs, as for example, in inert gas-shielded spot welding with a non-consumable electrode. The novel circuitry preferably consists of a bleeder resistor in parallel circuit relationship with a capacitor, which latter component acts initially as a low impedance in the pilot arc circuit. As the pilot arc is established, the impedance in the pilot arc circuit builds up as the capacitor becomes charged, so that the pilot arc becomes self-extinguishing. Novelty also resides in the fact that the bleeder resistor has sufficient resistance to prevent the pilot arc circuit from carrying any significant portion of the power supply output current once the arc is established.

What is claimed is:

1. In an arc working system, an arc torch comprising a main electrode and a gas nozzle insulated from said electrode, and means for initiating a working arc between said electrode and work in circuit therewith, comprising means for ionizing gas in said torch between said nozzle and said main electrode, means for supplying pulses of current to energize a pilot arc across the so-ionized gas path between said electrode and nozzle to further ionize gas flowing out of said nozzle as long as the arc torch is spaced more than a predetermined distance from such work, and means acting automatically to discontinue such pilot arc current pulses when the arc torch is located close enough to such work to cause such working arc to be established by the so-ionized gas flowing out of the nozzle, comprising a capacitor associated with said pilot arc current pulse supply means, said latter means comprising a direct current supply, whereby said capacitor acts as a conductor until the capacitor is fully charged, whereupon the pilot arc current ceases, and a bleeder connected to discharge said capacitor.

2. In an arc working system provided with means for first establishing a path of ionized gas between an electrode and the nozzle of an arc torch, means for energizing a pilot arc across such path to further ionize gas discharged from said nozzle to provide another stream of ionized gas between the end of said electrode and work in circuit relation with the electrode end and work when the so-discharged ionized gas stream is applied to the work; means for limiting the current energizing such pilot arc automatically comprising in series circuit with such pilot arc, a capacitor which is charged by such current and acts, when fully charged, to stop the flow of such current and thereby de-energize such pilot arc.

3. In an arc working system, as defined by claim 2, a bleeder comprising a resistor connected in parallel circuit relation with said capacitor to drain it.

References Cited in the file of this patent
UNITED STATES PATENTS

| | | |
|---|---|---|
| 2,133,152 | Schigyo | Oct. 11, 1938 |
| 2,858,411 | Gage | Oct. 28, 1958 |
| 2,867,730 | Welch | Jan. 6, 1959 |
| 2,922,871 | Hackman et al. | Jan. 26, 1960 |